Nov. 9, 1943.                D. LARKIN                2,333,869
                              ROPE CLAMP
                         Filed Dec. 21, 1942
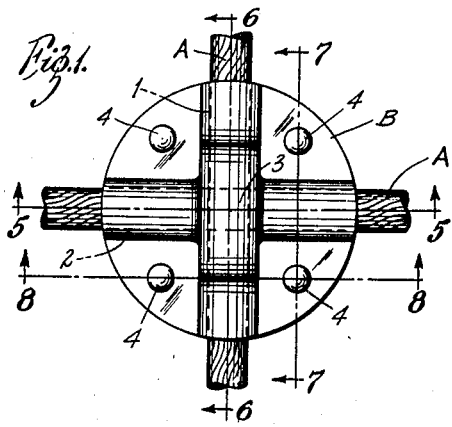
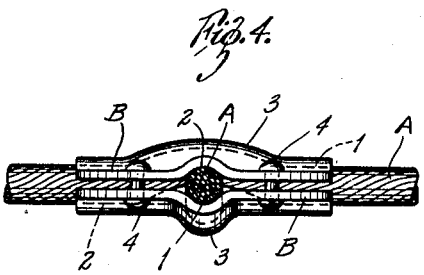
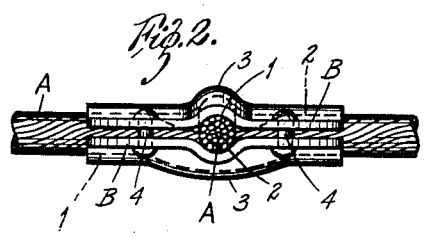
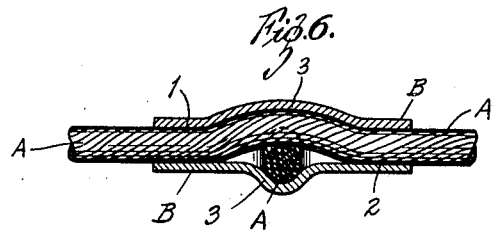
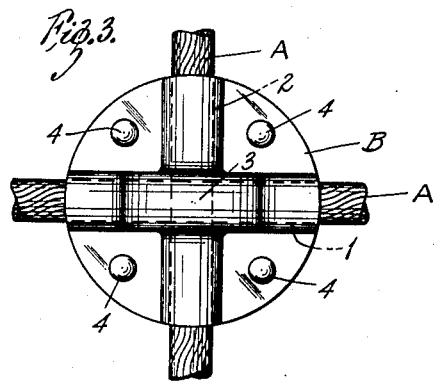
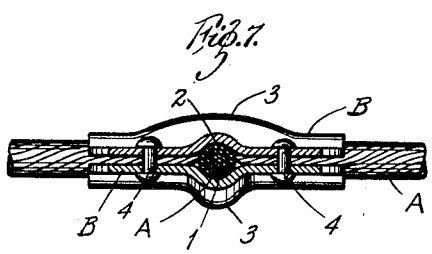
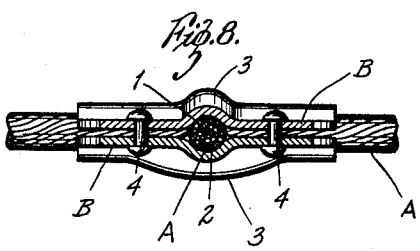
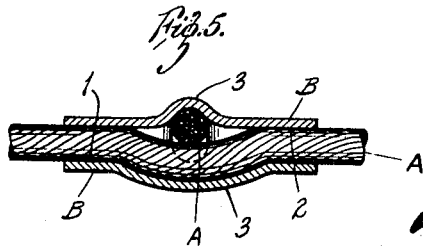
INVENTOR:
David Larkin
HIS ATTORNEYS.

Patented Nov. 9, 1943

2,333,869

UNITED STATES PATENT OFFICE 2,333,869

ROPE CLAMP

David Larkin, Kirkwood, Mo., assignor to Broderick & Bascom Rope Company, St. Louis, Mo., a corporation of Missouri Application December 21, 1942, Serial No. 469,607

1 Claim. (Cl. 287—49)

This invention relates to rope clamps. The principal object of the invention is to devise a simple and economical device for securely fastening together two crossed ropes at the place of intersecting, which will prevent relative movement of the crossed ropes at the intersection thereof, and which will hold both ropes in the same plane at the edges of said device. The invention consists in the rope clamp and in the construction, combinations and arrangements of parts hereinafter described and claimed.

In the accompanying drawing, which forms part of this specification and wherein like symbols refer to like parts wherever they occur, Fig. 1 is a face view of a rope clamp embodying my invention, the clamp being shown applied to two crossed ropes at the intersection thereof, Fig. 2 is an edge view of said clamp, looking towards one end of one of the rope receiving grooves, Fig. 3 is a view similar to Fig. 1, looking at the opposite face of the clamp, Fig. 4 is a view similar to Fig. 2, looking towards one end of the other rope receiving groove, Fig. 5 is a central cross-section on the line 5—5 in Fig. 1, Fig. 6 is a central cross-section on the line 6—6 in Fig. 1, Fig. 7 is a cross-section on the line 7—7 in Fig. 1; and Fig. 8 is a cross-section on the line 8—8 in Fig. 1.

The rope clamp shown in the accompanying drawing is adapted for use in fastening together two crossed ropes A of wire, hemp or other suitable material at the place of intersecting. The clamp comprises two rigid circular plates B of the same diameter and thickness. Each of the plates B has two intersecting diametral grooves 1 and 2, respectively, formed in the inner face thereof and disposed at right angles to each other. The grooves 1 and 2 of each plate B are disposed in the same plane at the edges thereof; and the groove 1 is longitudinally bowed outwardly, as at 3, at its point of intersection with the groove 2. The two plates B are positioned with the groove 1 of one plate in register with the groove 2 of the other plate.

The crossed ropes A are secured together by placing the two plates B one on each side thereof at the place of crossing, with the bowed groove 1 of each plate in register with plain groove 2 of the other plate and with the registering grooves of the two plates in position to receive said ropes.

The two plates B are then drawn together to clamp the crossed ropes in the registering grooves thereof by means of rivets or other fastening devices 4, which operation holds both ropes in the same plane at the edges of said plates and bends each rope over the other rope at the intersection of the two ropes, the outwardly bowed portion of the groove 1 in each plate being shaped to accommodate the bent portion 5 of the rope seated therein.

The hereinbefore described rope clamp has several important advantages. It permits the two crossed ropes to be firmly secured together at the place of crossing and maintains the two ropes in the desired angular positions relative to each other. It also maintains both ropes in the same plane at the edges of the clamp; and it also bends the ropes one over the other at the place of intersecting and thus prevents endwise slippage of the ropes in the clamp. The plates B of the clamp are preferably made of cast, forged, or pressed metal; and the grooves may be disposed at any desired angle. The clamp is particularly adapted for connecting the crossed ropes of cargo and submarine nets.

Obviously, the hereinbefore described rope clamp admits of considerable modification without departing from the invention. Therefore, I do not wish to be limited to the precise arrangement shown and described.

What I claim is:

A rope clamp comprising a pair of identical plates each formed of a disk-like sheet of metal of substantially uniform thickness, said plates being adapted to be respectively disposed on opposite sides of the intersection of two crossed ropes, each of said plates having a diametral groove extending continuously across the inner face thereof and a groove extending at right angles thereto and divided thereby for receiving the respective ropes, the portions of each plate, in the sectors between said grooves, being substantially flat and disposed in closely spaced parallel planes, and rivets passing through said flat portions of the plates along radii bisecting said right angles for permanently securing said plates together to rigidly clamp the two crossed ropes therebetween, whereby the two ropes are bent over each other at their intersection, each of said grooves being so shaped as to closely and uniformly embrace the rope therein throughout the entire length of the grooves.

DAVID LARKIN.